US012222591B2

(12) United States Patent
Abadian et al.

(10) Patent No.: US 12,222,591 B2
(45) Date of Patent: Feb. 11, 2025

(54) INTEGRABLE NON-RECIPROCAL OPTICAL COMPONENT, OPTICAL ISOLATOR, OPTICAL CIRCULATOR AND INTEGRATED CIRCUIT

(71) Applicants: UNIVERSITE PARIS-SACLAY, Saint-Aubin (FR); CENTRE NATIONAL DE LA RECHERCHE SCIENTIFIQUE, Paris (FR)

(72) Inventors: Sevag Abadian, Palaiseau (FR); Béatrice Dagens, Antony (FR); Giovanni Magno, Palaiseau (FR); Vy Yam, Antony (FR)

(73) Assignees: UNIVERSITE PARIS-SACLAY, Saint-Aubin (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 207 days.

(21) Appl. No.: 17/907,057

(22) PCT Filed: Mar. 23, 2021

(86) PCT No.: PCT/EP2021/057350
§ 371 (c)(1),
(2) Date: Sep. 22, 2022

(87) PCT Pub. No.: WO2021/191180
PCT Pub. Date: Sep. 30, 2021

(65) Prior Publication Data
US 2023/0111686 A1    Apr. 13, 2023

(30) Foreign Application Priority Data

Mar. 26, 2020   (FR) .................................. 2003003

(51) Int. Cl.
*G02F 1/09*     (2006.01)
*G02F 1/095*    (2006.01)
(Continued)

(52) U.S. Cl.
CPC .......... *G02F 1/0955* (2013.01); *G02F 1/3511* (2013.01); *G02B 6/29349* (2013.01)

(58) Field of Classification Search
CPC .. G02F 1/0955; G02F 1/3511; G02B 6/29349
(Continued)

(56) References Cited

U.S. PATENT DOCUMENTS 8,849,072 B2     9/2014  Montoya et al.
2009/0273820 A1*  11/2009  Dionne .................. G02F 1/025
                                                            359/107
(Continued)

FOREIGN PATENT DOCUMENTS

EP    2525200 A1    11/2012
FR    2981761 A1     4/2013
(Continued)

OTHER PUBLICATIONS

International Search Report and Written Opinion received for PCT/EP2021/057350, mailed May 12, 2021.
(Continued)

*Primary Examiner* — Jerry M Blevins
(74) *Attorney, Agent, or Firm* — Greer, Burns & Crain, Ltd

(57) ABSTRACT

An integrable, non-reciprocal optical component, with guidance, between two magneto-plasmonic interfaces each formed between a dielectric and a metal. An optical port and an input signal passes through a selection region providing a selected signal whose energy is concentrated in a single plasmonic mode, LRSPP or SRSPP, by a selection aperture of a width for which these modes have optical impedances
(Continued)

that differ significantly from each other, one of which ($z_{1eff}$) is close to, or equal to, the input optical impedance ($z_{0eff}$). The selected signal passes through a differentiation region, which enhances the asymmetry between the two magneto-plasmonic interfaces, to concentrate its energy on a single magneto-plasmonic interface. The differentiated signal passes through a non-reciprocal treatment region formed by two magneto-plasmonic interfaces of non-equivalent geometries. The input signal will thus undergo different treatment from a reverse signal.

21 Claims, 4 Drawing Sheets

(51) Int. Cl.
 *G02F 1/35* (2006.01)
 *G02B 6/293* (2006.01)
(58) Field of Classification Search
 USPC .............................................................. 385/6
 See application file for complete search history.

(56) References Cited

U.S. PATENT DOCUMENTS

| | | | | |
|---|---|---|---|---|
| 2010/0316327 | A1* | 12/2010 | Montoya | G02F 1/011 427/163.2 |
| 2013/0128917 | A1* | 5/2013 | Weeber | G02B 6/1226 374/45 |
| 2014/0161405 | A1* | 6/2014 | Kim | B82Y 20/00 385/126 |
| 2019/0049757 | A1* | 2/2019 | Bowers | G02F 2/002 |

FOREIGN PATENT DOCUMENTS

| | | | | |
|---|---|---|---|---|
| WO | WO-2013057444 | A1 * | 4/2013 | ........... G02F 1/0955 |
| WO | 2017136459 | A1 | 8/2017 | |

OTHER PUBLICATIONS

French Search Report received for Application No. 2003003, dated Dec. 3, 2020.

Magno, G., et al., "Integrated magnetoplasmonic nanostructures for non-reciprocal optical devices," Asia Communications and Photonics Conference, OSA, 2016, 3 pages.

Takei, R., et al., "Design and Simulation of Silicon Waveguide Optical Circulator Employing Nonreciprocal Phase Shift," 2010 Jpn. J. Appl. Phys. 49 052203-1 to 052203-6.

Van Parys, W., et al., "Transverse magnetic mode nonreciprocal propagation in an amplifying AlGaInAs/InP optical waveguide isolator," Applied Physics Letters 88, 2006, pp. 071115-1 to 071115-3.

Vanwolleghem, M., et al., "Compact Integrated Optical Isolation Based on Extraordinary Dichroic Transmission Through a Magnetoplasmonic Waveguide Grating," SPIE Photonics Europe, Nanophotonics III, vol. 7712, 2010, 11 pages.

* cited by examiner

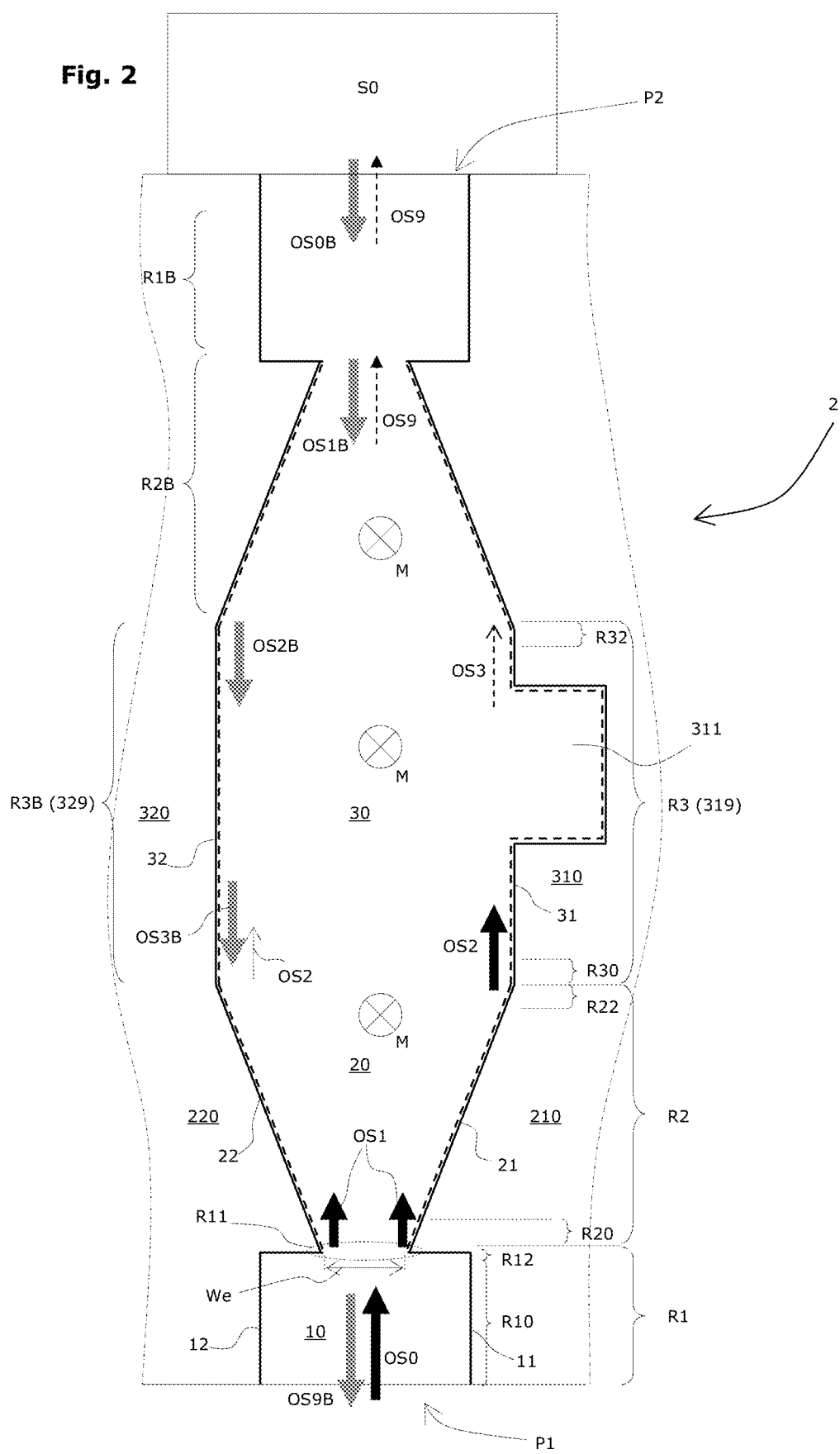

Fig. 3a
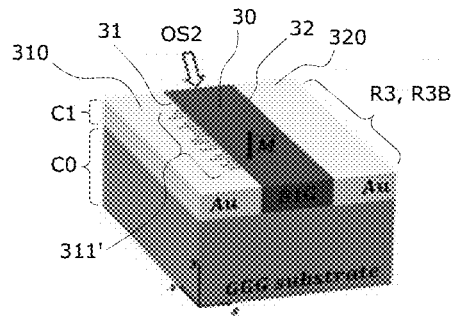
Fig. 3b
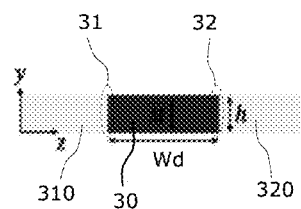
[Fig.4]
Fig. 4
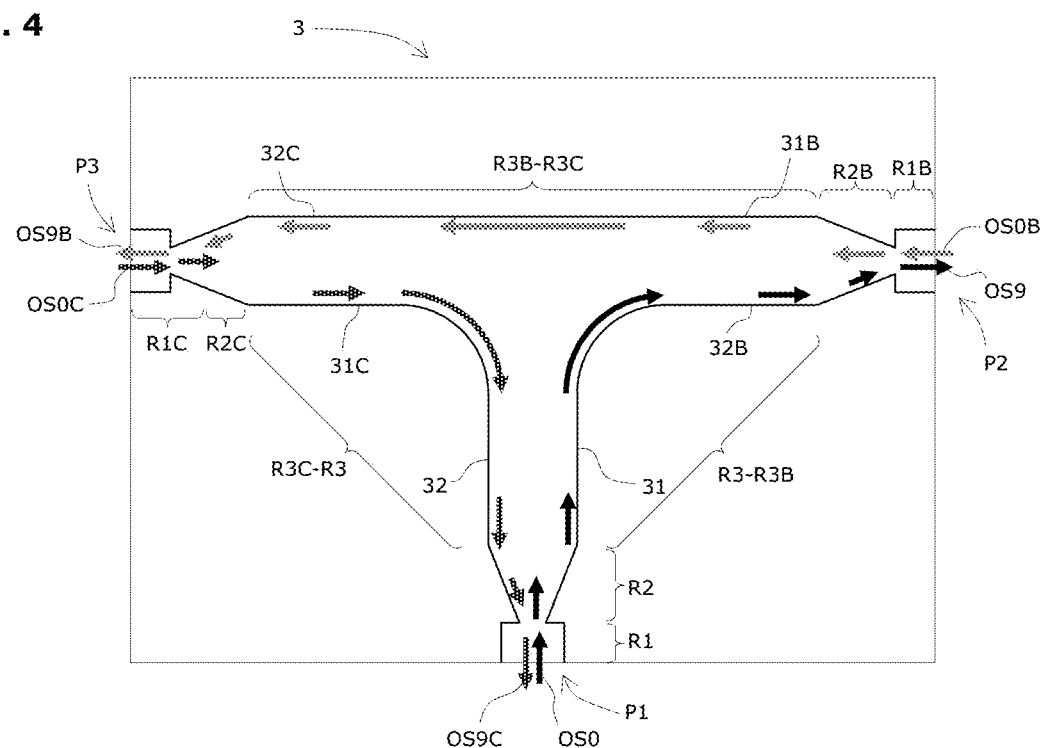
[Fig.5]
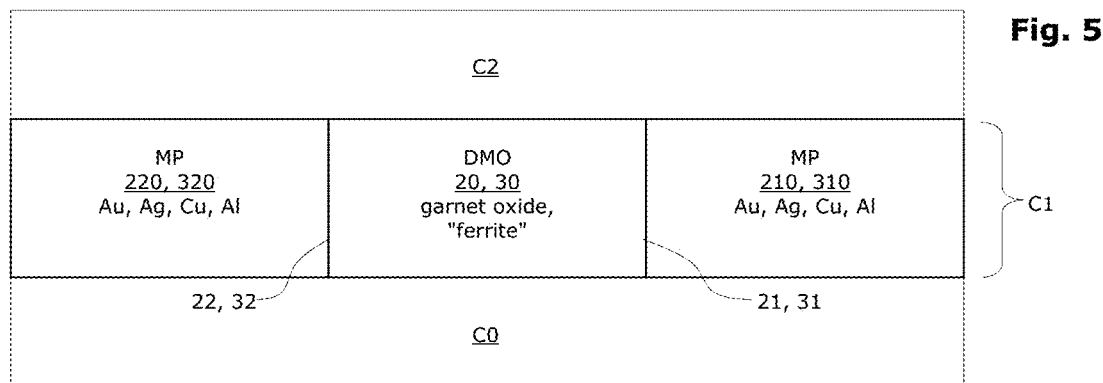
Fig. 5

INTEGRABLE NON-RECIPROCAL OPTICAL COMPONENT, OPTICAL ISOLATOR, OPTICAL CIRCULATOR AND INTEGRATED CIRCUIT

BACKGROUND

The invention relates to an integrable non-reciprocal optical component, in particular an optical isolator or circulator, with guidance, in particular sub-wavelength guidance, between two magneto-plasmonic interfaces each formed between a dielectric and a metal.

From an optical port, an input signal passes through a selection region providing a selected signal the energy of which is concentrated in a single plasmon mode, LRSPP (for "Long Range Surface Polariton Plasmon") or SRSPP (for "Short Range Surface Polariton Plasmon"), in particular via a selection aperture of a width for which these modes have optical impedances that differ significantly from each other, one of which is close to, or equal to, the input optical impedance, sufficiently to obtain a selected optical signal that can be utilized in the chosen plasmon mode.

The selected signal passes through a differentiation region, which creates or increases the asymmetry existing between the two magneto-plasmonic interfaces, in order to concentrate its energy on a single magneto-plasmonic interface.

The differentiated signal passes through a non-reciprocal treatment region formed by two magneto-plasmonic interfaces of non-equivalent geometries, in particular absorption cavities on one side only or a diversion each to a different optical output port. The input signal will thus undergo different treatment from a reverse signal.

It also relates to an optical isolator, an optical circulator, and an integrated circuit including such a component in an integrated form.

Guided optical signals are used in many fields, for example in telecommunications, but also in many other fields such as sensors or data processing circuits. Within optical or photonic circuits, different types of components are used to process or distribute such signals, in different wavelengths, such as for example of the order of 1.55 μm for telecommunications. The miniaturization of such circuits is actively sought in order to enhance compactness and processing power.

For some twenty years, photonics has been widely developed on a nanometric scale, which moreover allows increased light-material interactions with many applications in photonics and in optoelectronics in the fields of emission, detection, imaging or optical guidance.

In order to perform certain types of functionalities within an optical circuit, it is necessary to have components available that have non-reciprocity, i.e. that treat an optical signal differently according to the direction of propagation of this signal.

It is known to produce a non-reciprocal optical component by using magneto-optical properties of the Kerr transverse effect type (TMOKE "Transverse Magneto Optical Kerr Effect"), combined with a metallic layer providing a plasmon guidance effect, i.e. that produces a resonance between the optical signal in the guide and the surface electrons of the metallic wall.

These may be for example optical isolators that use absorption non-reciprocity to allow a signal to pass in one direction but block it in the other direction or significantly attenuate it; as described in the publication by Van Parys et al. "Transverse magnetic mode nonreciprocal propagation in an amplifying AlGaInAs/InP optical wave guide isolator", Applied Physics Letters 88, 071115 (2006).

These may also be circulator devices comprising more than two optical ports permanently optically linked to each other, in which the circulation of a signal between two given ports takes place in one direction only, using the index non-reciprocity to produce non-reciprocal phase shifts, as described in the publication by Takei and Mizumoto: "Design and Simulation of Silicon Waveguide Optical Circulator employing Non Reciprocal Phase Shift", Jpn. J. Appl. Phys. 49 (2010) 052203.

Such non-reciprocal components are based on an optical signal that is confined in an optical guide a single one of the walls of which generates such magneto-plasmonic effects, as for example in the document U.S. Pat. No. 8,849,072, unlike the reciprocal optical circuits using plasmon guidance in which the guidance takes place between two plasmonic walls.

However, these non-reciprocal components remain bulky and difficult to incorporate into an integrated circuit, as this non-reciprocity effect needs a certain amplification in order to be sufficiently effective. This non-reciprocal effect is generally enhanced by a resonator, for example by a ring resonator as described in the document FR 2 981 761, which is not only bulky but complex, and involves additional constraints.

Thus, it is difficult and/or complex and therefore costly to produce such devices that are truly compact, and even more so, which are integrated on one and the same component, and for example to efficiently integrate therein laser sources and the distribution circuits thereof.

To date, no proposed solution has performed sufficiently well to be integrated in a photonic circuit. The only isolator or circulator components on the market are based on massive garnet assembled with polarizers and are several centimetres long, in non-guided optics, but coupled to optical fibres.

An aim of the invention is to overcome all or part of the drawbacks of the state of the art.

In particular, it is sought to obtain a non-reciprocal treatment of a guided optical signal, by means of a component that is separate or forms a part of an optical circuit, while minimizing the bulk and/or facilitating the integration thereof.

SUMMARY

The invention proposes an optical component comprising at least one first port or optical guide, and a second port or optical guide, communicating between each other in non-reciprocal optical fashion, which connect said component or allow the connection thereof within a guided optical circuit, so as to be able to exchange an optical signal with said optical circuit on the one hand in a first direction and on the other hand in a second direction, which is opposite to the first direction, through at least one magneto-plasmonic guidance region.

The term magneto-plasmonic denotes herein a combination of plasmon guidance and magneto-optical effect, the latter typically being of the TMOKE type.

By the term "plasmon guidance" is meant herein carrying out a surface interaction with the metal, even if this metal is of a type that is not always considered in itself as "plasmonic", for example iron-cobalt.

More particularly, the component according to the invention was designed and simulated, and is arranged and determined to process an optical signal, having a wavelength less than 50 µm, and in particular less than 20 µm or 10 µm, and more particularly less than 3 µm, for example around 1.55 µm or another frequency used in telecommunication.

According to the invention, said component includes a plurality of regions that can be passed through successively by an optical signal travelling, in the first direction, from said first optical port towards said second optical port.

This plurality comprises at least, in this order and for example contiguously between all or part thereof: a selection region, a differentiation region, and a non-reciprocal treatment region.

The selection region is arranged to:
receive at input an input optical signal propagating there according to an input optical impedance $Z0_{\it eff}$, i.e. a guided mode impedance, which is typically proportional to the inverse of an input effective index. This input optical signal is typically, but not obligatorily, received in a guided form. In this selection region, and possibly also upstream, the guidance can be plasmonic or not, and is typically presented in a polarized form, preferably TE polarized, and
emit at output, by means of plasmon guidance, an optical signal called selected optical signal, including a first plasmon mode and a second plasmon mode, in which the second plasmon mode has an amplitude that is zero, or significantly lower than the first plasmon mode, typically by a factor of at least 50 in intensity and preferably a factor of 100; these first and second plasmon modes being defined as being:
for one, preferably the first plasmon mode, the LR mode (or LRSPP, for "Long Range Surface Polariton Plasmon"), and
for the other, preferably respectively the second plasmon mode, the SR mode (or SRSPP, for "Short Range Surface Polariton Plasmon").

The differentiation region is arranged to receive at input the selected optical signal originating from the selection region, in an input part, and guide it to an output part where it forms an optical signal called differentiated optical signal, by a guidance core called differentiation core extending between at least two interfaces, called differentiation interfaces. This arrangement includes for example the presence of magnetization.

These differentiation interfaces:
are formed between a core material and at least one outer material, of which one is dielectric and the other is metallic,
are situated on two opposite sides of this guidance core, and
are determined to produce between them a magneto-plasmonic guidance.

In this differentiation region, the output part is arranged to have, between said differentiation interfaces, a differentiation width Wd chosen so that the first plasmon mode of the signal has an amplitude asymmetry, between said differentiation interfaces, greater than a determined threshold.

This differentiation region is thus arranged to provide at output an asymmetrical optical signal, called differentiated signal, the amplitude of which is concentrated on the first differentiation interface. That is to say, it is stronger on the first differentiation interface and weaker or even negligible on the second differentiation interface, typically in a ratio greater than 50 and in particular greater than or equal to 100.

The non-reciprocal treatment region is arranged to receive at input the differentiated signal originating from the differentiation region, and guide it via a treatment part to an output region where it forms an optical signal called treated optical signal. This guidance takes place in a guidance core, called treatment core, which extends between at least one first treatment interface and a second treatment interface. This arrangement includes for example the presence of magnetization.

These treatment interfaces:
are each formed between a treatment core material and an outer material, of which one is dielectric and the other is metallic;
are situated on the same two opposite sides as the first and respectively second differentiation interfaces;
are determined to produce between them a magneto-plasmonic guidance; and
are arranged to have, between the input and the output of said treatment region, geometries that are not equivalent to each other, in particular in the effect thereof on the signal over the entirety of the length thereof, for example by introducing between them a break in the spatial symmetry.

This non-reciprocal treatment region is thus arranged to provide at output, in the first direction, a treated optical signal the amplitude of which has undergone, only or mainly, a treatment produced by the geometry of the first treatment interface alone, since the energy of this signal is concentrated on the first treatment interface.

For its part, a signal called reverse signal, passing through said non-reciprocal treatment region in the second direction, will undergo a treatment produced by the geometry of the second treatment interface alone (if this reverse signal is itself also differentiated) or by both the two treatment interfaces, thus providing a treated reverse signal having undergone a different treatment from that undergone by the treated signal travelling in the first direction.

Typically, each port includes the whole set of these regions: selection, differentiation, then treatment. Typically, two ports communicating between each other share one and the same treatment region, or a part of one and the same treatment region. Thus, the treatment region or regions that link(s) two ports to each other will always receive a differentiated signal, both in the first direction and in the second direction. And each one thereof will undergo only the treatment produced by the geometry of the treatment interface that constitutes the first treatment interface thereof, i.e. a different interface and geometry according to the direction of travel.

For example, if the differentiation region is identical for each port and is arranged to weaken or cancel out the amplitude of the signal on the left interface considered in the direction of propagation, then the differentiated signal will be concentrated on the right interface and the treated signal will have undergone the treatment determined by this right interface alone.

Within a channel linking two ports, it is possible to consider that one of the sides will be passed through by the plasmons of the signals propagating in the first direction, and that the other side will be passed through by the plasmons of the signals propagating in the second direction.

As will be understood, this succession of differentiation and treatment processes is carried out by a magneto-plasmonic guidance that exists on two opposite sides of the guidance core, unlike the components of the prior art.

In the prior art, guidance between two close magneto-plasmonic interfaces is conventionally considered as not having a non-reciprocity effect.

In a different fashion, the inventors have identified and implemented an asymmetry that can be obtained in the distribution of the intensity of the signal between these two interfaces, by choosing one or more specific widths for the spacing apart of these interfaces. This makes it possible for the invention to treat the input signal so that the intensity thereof is concentrated on a single one of these two plasmonic interfaces, and therefore undergoes the treatment of only a single one of these interfaces. The non-reciprocity is then obtained by combining this lateral concentration with a treatment that differs from one interface to the other.

According to a feature, the selection region has:
- an input part forming an optical guidance, preferably optical only, but possibly also plasmonic.
- an output part forming a magneto-optical plasmon guidance between two magneto-plasmonic interfaces.

These input and output parts communicate with each other via a selection aperture that has a selection width We, measured between the two plasmonic interfaces, typically narrower than the input width of the selection part.

The input optical signal received in the input part thus excites an optical signal in the output part, which exits the output part to form the selected optical signal, which includes the first plasmon mode and the second plasmon mode.

The optical guidance of this selection input part has, for the signal received at input, an input optical impedance $Z0_{\mathit{eff}}$, i.e. the optical impedance of the guided mode, for example in the form of an effective index.

According to this feature, the selection width We is determined, in combination with the input optical impedance value $Z0_{\mathit{eff}}$, so that:
- the first plasmon mode has a first optical impedance $z1_{\mathit{eff}}$ that is substantially equal to the input optical impedance $Z0_{\mathit{eff}}$, i.e. at least sufficiently close to obtain a usable selected optical signal in this first plasmon mode, and
- the second plasmon mode has a second optical impedance $z2_{\mathit{eff}}$ that is significantly different from the first optical impedance $z1_{\mathit{eff}}$, i.e. sufficiently different to obtain a weakening of the selected optical signal in the second plasmon mode, for example by a factor of 50 or even a factor of 100.

By adjusting the selection width, and possibly other characteristics that influence the optical impedance, an input signal is thus obtained that in the output part and through the selection aperture, excites an optical mode according to the first plasmon mode, to the exclusion of the second plasmon mode (or with an amplitude significantly greater than that of the second plasmon mode). The optical signal that exits the output part (of the selection region) thus forms a selected optical signal that has only the first plasmon mode.

It will be noted that the optical impedance is defined by the formula:

$$Z_{medium} = \sqrt{\frac{\mu_r \mu_0}{\varepsilon_r \varepsilon_0}} \quad \text{[Math. 1]}$$

The optical impedance is therefore proportional to the inverse of the effective index n; with $n^2 \sim = \varepsilon$ where $\varepsilon = \varepsilon_r \varepsilon_0$, $\varepsilon$ is the permittivity, $\varepsilon_r$ is the relative permittivity, $\varepsilon_0$ is the vacuum permittivity, $\mu_r$ is the relative permeability and $\mu_0$ is the vacuum permeability.

In many cases, the optical impedance of the guided mode is directly linked to the effective index. Thus, in a large number of embodiments of the invention, the term "optical impedance" can be replaced by the term "effective index".

Other types of arrangements make it possible to select the first plasmon mode by eliminating the second plasmon mode in a signal, and can also be used in the invention to carry out such a selection, and produce the selected optical signal.

According to another feature, preferably but not obligatorily, combined with the preceding one, the differentiation region has a geometry with increasing width from the input width thereof (capable of being for example the same as the selection width We) to the differentiation width Wd, for example symmetrically around the differentiation core, and/or continuously increasing or even regularly increasing.

In the case of a selection via aperture with selection width We, the differentiation region receives a selected signal that comprises only a single plasmon mode. However, this selection width typically corresponds to a configuration in which the selected plasmon mode, i.e. the first plasmon mode, does not have a very significant asymmetry.

Within the differentiation region, such a width variation is chosen to reach at output a differentiation width for which this first plasmon mode has a significant asymmetry between the right interface and the left interface, defined with respect to the direction of propagation of the signal, i.e. respectively the first interface and the second interface.

At output from this differentiation region, the first plasmon mode is thus concentrated on the first interface. If the second plasmon mode were still present, it would for its part be concentrated on the second interface. Due to the fact that this second plasmon mode has been suppressed or minimized beforehand by the selection region, the differentiated optical signal concentrates its intensity on the first intensity alone.

Typically, and possibly in all the embodiments, the non-reciprocal treatment region also has a geometry the input width and/or the average width of which are substantially equal to the differentiation width Wd, at least in the part where the two treatment interfaces have a different geometry.

Other types of arrangements make it possible to differentiate the first plasmon mode and the second plasmon mode from each other in a signal, and can also be used in the invention to carry out such a differentiation, and produce the differentiated optical signal.

The invention makes it possible to integrate a compact high-performance non-reciprocal optical component into a photonic circuit, for example an isolator or a circulator, in particular planar in the broad sense, with a simple technological process. The photonic circuit can be for example a simple laser, or even a circuit comprising many guided optical functions.

The proposed solution has major advantages, in particular:
- such a component can be very compact (a few microns to a few tens of microns for operation in the near infrared), which also limits the losses induced;
- the optical function is wideband (spectral range of several tens of nanometres), while the high-performance isolators currently proposed operate resonantly over a fraction of a nanometre. The spectral band is adjustable for an isolator, and very wide for a circulator;
- in certain versions (FeCo-silica-FeCo for example), the structure can be integrated into any photonic platform with a standard manufacturing process and with few steps, and can operate with remanent magnetization;
- the typical isolation rate of a structure of a few microns in length reaches approximately 10 dB, for a wide band, and is "cascadable" (summable). Even before any particular optimization, the isolation/losses compromise is very high with respect to the usual plasmon structures. The invention allows for example a level of total losses of ~5 dB for an isolator of 10 dB. This level of losses can easily be compensated by amplification.

Preferably, but not obligatorily, the selection region is arranged so that the first plasmon mode corresponds to the LRSPP-type mode of the input signal.

According to a preferred feature, the differentiation core and/or the treatment core (and preferably both) are made from a dielectric material; and their outer materials are made from one or more metallic materials. Thus a structure is obtained of the type that can be called "slot", also called MIM (for "Metal Insulator Metal") or MDM (for "Metal Dielectric Metal").

Alternatively, the differentiation core and/or the treatment core (and preferably both) are made from a metallic material; and their outer materials are made from one or more dielectric materials. Thus a structure is obtained of the type that can be called "rib" or "wire", also called IMI (for "Insulator Metal Insulator") or DMD (for "Dielectric Metal Dielectric").

In both cases, these materials are chosen to produce between them a plasmon guidance interface implementing a magneto-optical effect.

Preferably, but not obligatorily, the different cores are produced, wholly or partially, in a planar or bidimensional layer included between a lower layer and an upper layer, and the interfaces producing the guidance in said cores form planar or bidimensional surfaces transverse to said layers. The guidance interfaces, in particular those that are magneto-plasmonic, thus form "vertical" surfaces inside one and the same layer of manufacture of the component. It is thus much easier to produce the desired shapes for these interfaces, than if it were necessary to produce geometric structuring between two superposed layers.

It should be noted that the upper and/or lower layers can be constituted by air or vacuum, thus forming an uncovered and/or suspended guidance.

Treatment by Absorption

According to a first family of embodiments, the first treatment interface has a geometry comprising one or more absorption cavities, for example of the Helmoltz and/or Fabry-Perot type.

This cavity or these cavities has(have) for example a geometry arranged to absorb an optical signal of a determined frequency wholly or partially. There may be in particular several cavities having the same dimensions, determined to absorb a greater part of the signal.

They are also possibly arranged to absorb an optical signal comprising a plurality of different frequencies wholly or partially, in particular a plurality of mutually shifted frequencies so that said treatment interface absorbs all the signals within a determined frequency range. There may then be several cavities or groups of cavities having different dimensions, determined to absorb a plurality of wavelengths, and thus act on a wider frequency band.

The second treatment interface then has a geometry that is arranged to allow the passage of an optical signal of said determined frequency or frequencies.

Thus a component is obtained one or more frequencies of which are blocked in one direction, but not in the other direction.

Preferably, the first and second optical guides or ports each comprise a selection region and a differentiation region, and are linked to each other by at least one first treatment region, the first treatment interface of which is arranged to absorb an optical signal of one or more determined frequencies wholly or partially, and the second treatment interface of which is arranged to allow said optical signal to pass. The treatment region of the first optical port can then be regarded as forming the treatment region of the second optical port.

The selection and differentiation regions of the second optical port will thus act in the same fashion on an optical signal arriving in the reverse direction. They will select respectively the first plasmon mode then concentrate it on the first interface viewed in the second direction, i.e. on the second interface viewed in the first direction.

Thus, for a given frequency or range of frequencies, if one of the treatment interfaces is absorbent while the other treatment interface is passing, an optical isolator is thus obtained that is passing in the second direction (forming an outward direction) and that is blocking in the first direction (forming the return direction of the isolator).

Such an isolator can for example be incorporated into an integrated circuit including a laser source, so as to allow the signal emitted by the laser to pass in the outward direction while blocking the reflections that could come back in the return direction, for example so as to allow a power function without risk of loss of coherence by optical return. Applications are for example telecoms, and in particular the monolithic integration of lasers or semiconductor amplifiers into photonic circuits.

Treatment by Diversion

According to a second family of embodiments, the first treatment interface of the first optical port has a geometry that forms a diversion with respect to the second treatment interface. Such a diversion is for example arranged so that the first treatment interface ends up at a different optical port, or travels a different distance, or incorporates an additional or different treatment.

According to a feature, the first treatment interface of the first optical port has a geometry that connects it with the second optical port so as to guide a differentiated optical signal originating from said first port to emit an output optical signal via said second port. For its part, the second treatment interface of said first optical port has a geometry that connects it with a third optical port, to receive a differentiated optical signal originating from said third port and emit it as an output optical signal via the first port, thus producing an optical circulator.

By applying the same configuration to each of the optical ports of a component, a circulator is for example obtained that diverts each input signal to the following optical port, possibly in a circular fashion if the last optical port diverts to the first optical port.

It is thus possible to produce an integrated optical circulator for multiplying the functions on a photonic circuit, for example for successive sensor or bio-detection functions, for example in combination with a microfluidic circuit. The integrated circulator function thus makes it possible to demultiply the functions of a circuit without adding bulk.

It is also possible to obtain a phase shift, by producing two treatment interfaces having different geometries arranged to give them different interface lengths.

Integrated Circuit

According to another aspect, the invention proposes a device comprising one or more non-reciprocal optical components such as disclosed herein, produced in integrated fashion within an integrated optical circuit.

According to features that may be combined with one another:
this integrated optical circuit includes at least one integrated laser emitter, and it comprises at least one non-reciprocal optical component with non-reciprocal absorption such as disclosed herein, which is connected to said laser in order to allow the passage in one direction of an optical signal emitted by said laser, while preventing or reducing a return of the optical signal to said laser in the opposite direction.

this integrated optical circuit comprises a plurality of sensors produced or connected in integrated fashion, and at least one non-reciprocal optical component with diversion or of the circulator type such as disclosed herein, which is connected with at least two of said sensors.

this integrated optical circuit comprises at least one non-reciprocal optical component with diversion or of the circulator type such as disclosed herein, which is connected or arranged to produce a Michelson interferometer wholly or partially in integrated fashion, for example in the signal processing field.

According to yet another aspect, the invention proposes a method for treatment of an optical signal characterized in that it comprises a treatment of said optical signal by passing through at least one non-reciprocal optical component such as disclosed herein, or within a device such as disclosed herein.

Various embodiments of the invention are envisaged, incorporating the different optional characteristics disclosed herein, according to all of the possible combinations thereof.

BRIEF DESCRIPTION OF THE DRAWINGS

Other features and advantages of the invention will become apparent from the detailed description of an embodiment that is in no way limitative, and from the attached drawings, in which:

FIG. 2 is a diagrammatic top view showing a component of the isolator type according to an example embodiment of the first family;

FIGS. 3a and b are diagrams showing the treatment region of a component of the isolator type: respectively in perspective and in cross-sectional view of the optical guide;

FIG. 4 is a diagrammatic top view showing a component of the circulator type according to an example embodiment of the second family;

FIG. 5 is a diagrammatic cross section of the optical guide, showing a first example arrangement of the materials of a component according to the invention;

DETAILED DESCRIPTION

The invention relates to a new structure of a guided magneto-optical plasmon component with non-reciprocal transmission.

In this example the elementary structure is constituted by a sub-wavelength guide of the metal-dielectric-metal type, also called metal-insulator-metal (MIM) type, in which either the dielectric or the metal has magneto-optical properties in the frequency range in question.

This structure makes it possible to produce a planar optical isolator or circulator, independent or integrated into a photonic circuit, operating over a wide spectral range.

The phenomenon that induces the non-reciprocity herein is a specially adapted use of a phenomenon of asymmetric spatial distribution of the magneto-plasmonic modes of the MIM, obtained when magnetization of the material MO and polarization of the propagated wave are chosen so as to generate the TMOKE effect (magnetization parallel to the layer plane and polarization of the wave perpendicular to this plane and to the magnetization). However, the two modes, even and odd, that are propagated in the MIM (in this example) have an opposite asymmetry. For this reason, they compensate each other in a conventional signal, as they are both excited at the same time.

In order to utilize this physical phenomenon to obtain a non-reciprocal transmission, the signal is treated so that only one of the two modes is excited. This selection treatment is carried out herein by selecting at the input of the MIM guide, through a guide that is narrow or tapered, only one of the plasmon modes: only the even or only the odd. In fact, the effective index of the even mode and of the odd mode become significantly different for very narrow guides. The chosen mode is then selected by using an aperture that produces the effective index corresponding to the mode envisaged.

Figure 1:
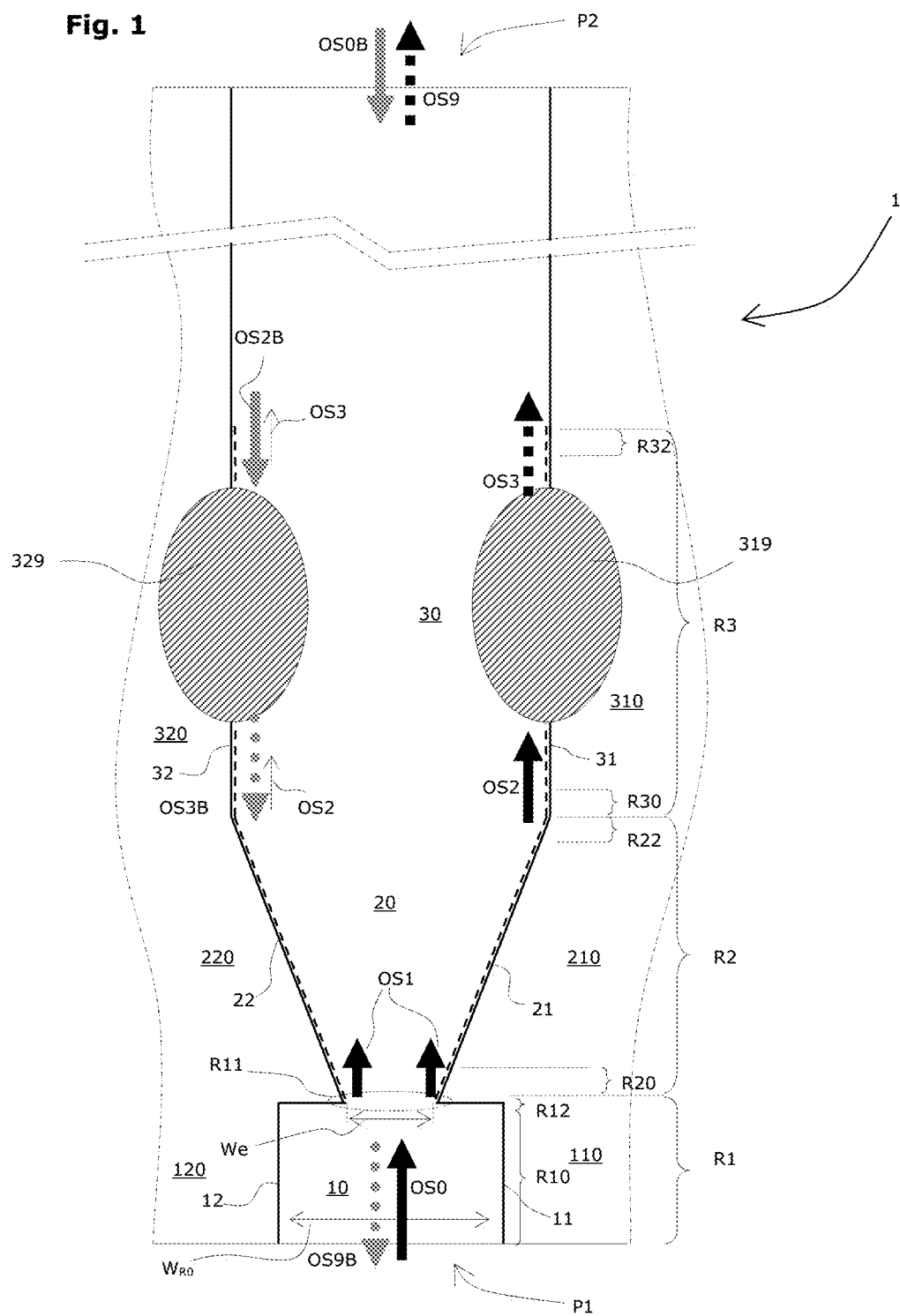
FIG. 1 is a diagrammatic partial top view showing different regions of an optical port of a component according to the invention.

FIG. 1 shows an example non-reciprocal component 1, in a generic form and detailing only a single optical port P1.

This optical component 1 comprises a first port P1 and a second port P2 communicating between them in optical fashion. These optical ports thus form a connection of said component within a guided optical circuit. This circuit can be formed by external optical fibres connected to the optical ports. It can also form a monolithic integrated circuit, which allows a high degree of compactness. Within this optical circuit, this component 1 can thus be passed through on the one hand in a first direction by an input optical signal OS0 and on the other hand in a second direction, opposite to the first direction, by a reverse input optical signal OS0B.

In this generic example, it is assumed that the two optical ports P1 and P2 communicate with each other, in such a way that each input signal OS0 and OS0B exits via the opposite pole in the form of an output signal OS9 and OS9B. But this component can absolutely have more than two ports, which communicate with each other differently, for example as shown in FIG. 4.

The optical communication between the ports is carried out by a guidance material 10, 20, 30 forming an optical guide between its lateral interfaces with outer materials, on one side 110, 210, 310 and on the other side 120, 220, 320.

As can be seen, an input optical signal OS0 that enters via the first port P1 of this component 1 passes successively through a plurality of regions R1, R2, R3, including the following regions in this order: a selection region R1, a differentiation region R2, a treatment region R3.

On arriving via the first optical port P1, the input optical signal OS0 enters a selection region (R1). This selection region is formed herein by a selection core 10, which guides the signal received between the left lateral interface 11 and the right lateral interface 12.

This selection region (R1) has an input part (R10) that receives the input signal OS0. It forms a guidance that has, for the signal received at input, an input optical impedance of the guided mode, for example an input effective index $z0_{\mathit{eff}}$. This input part includes herein a guidance that is optical only, but could also operate in magneto-plasmonic fashion. The optical signal then propagates to an output part R12 forming a magneto-optical plasmon guidance, produced between two magneto-plasmonic interfaces.

The input part R10 and the output part R12 communicate with each other via a selection aperture (R11) that has a determined selection width We, typically narrower than the input width $W_{R0}$ (of this selection region R1). The input optical signal OS0 thus excites, through the selection aperture R11, an optical signal called selected optical signal OS1, which propagates in the output part R12 towards the differentiation region R2. It can be considered herein that this output part R12 is merged with the start R20 of the differentiation region R2.

This selected optical signal OS1, which propagates in this way in a magneto-plasmonic guided mode, has an energy that is distributed between a first plasmon mode and a second plasmon mode.

One of these first and second plasmon modes is the LR mode (or LRSPP, for "Long Range Surface Polariton Plasmon"), preferably the first plasmon mode. The other of these first and second plasmon modes is the SR mode (or SRSPP, for "Short Range Surface Polariton Plasmon"), preferably the second plasmon mode.

The width We of this selection aperture R11, combined with the other characteristics of the output part R12 of the selection region R1, determines for the selected optical signal OS1 a selection optical impedance $z1_{eff}$, for example in the form of a selection effective index.

These characteristics, in particular the width We, are chosen to produce a selection optical impedance $z1_{eff}$ for which:
- the first plasmon mode has a first optical impedance of the guided mode $z1_{eff}$, for example a first effective index, which is substantially equal to the input optical impedance $z0_{eff}$, and
- the second plasmon mode has a second optical impedance of the guided mode $z2_{eff}$, for example in the form of a second effective index, which is significantly different from the first optical impedance $z1_{eff}$.

Thus the input signal OS0 excites, in the output part R12 and through the selection aperture R11, an optical mode according to the first plasmon mode alone. That is to say, to the exclusion of the second plasmon mode, or with an amplitude significantly greater than that of the second plasmon mode, typically a factor of 100 in intensity.

Thus a selected optical signal OS1 is obtained that includes substantially only the first plasmon mode.

As indicated by the two bold black arrows, this signal OS1 has an energy that is distributed, although not necessarily uniformly, over the two selection interfaces 11, 12. In fact, for the frequencies in question, for the selection optical impedance $z1_{eff}$ (chosen so that the energy is distributed very unequally between the two plasmon modes to allow the selection of the first mode), there is generally very little spatial asymmetry between the two magneto-plasmonic interfaces.

The differentiation region R2 receives at input R20 the selected optical signal OS1 originating from the selection region R1, and guides it to its output part R32 where it forms an optical signal called differentiated optical signal OS2.

This guidance takes place in a guidance core, called differentiation core 20, which extends between two lateral interfaces called differentiation interfaces 21, 22, situated on the two opposite sides.

These differentiation interfaces 21, 22 are each formed between a core material and at least one outer material (typically the same on both sides), of which one is dielectric 20 and the other is metallic 210, 220, which are chosen and arranged to produce between them a magneto-plasmonic guidance. In this example, it relates to a TMOKE effect, obtained by inducing a magnetization M, for example by subjecting it to a magnetic field or under the effect of remanent magnetization.

As can be seen, the differentiation region R2 has a geometry with increasing width from the input width thereof We to a differentiation width Wd. This widening is for example symmetrical around the differentiation core, and/or continuously increasing and preferably regularly increasing.

This differentiation width Wd is chosen, in combination with the other characteristics of this differentiation region R2, so that the first plasmon mode of the selected optical signal OS2 has a large spatial amplitude asymmetry between said differentiation interfaces, for example of a factor of 100 from one interface to another.

In this example, this output part R22 is arranged so that the energy of the differentiated optical signal OS2 is concentrated on the right interface, i.e. the differentiation interface 21. This asymmetry is shown by the arrows representing the distribution of the energy of the differentiated signal OS2 on the left and right interfaces: bold arrow on the right interface 21-31, and fine arrow on the left interface 22-32.

At this stage, as will be understood, the selection region R11 has concentrated the energy of the input optical signal OS0 in a single plasmon mode, the first; then the energy was concentrated in the differentiation region R2 on a single lateral interface, herein the first differentiation interface 21 situated on the right of the figure.

The non-reciprocal treatment region R3 receives at input R30 the differentiated signal OS2 originating from the differentiation region R2, and guides it via a treatment part 31 to an output region R32 where it forms an optical signal called treated optical signal OS3, via a guidance core, called treatment core 30, extending between at least one first treatment interface 31 and a second treatment interface 32, In this example, the differentiation width Wd is substantially equal to the input width of the non-reciprocal treatment region R3, and/or to the average width of this non-reciprocal treatment region R3, for example in the part thereof where the two treatment interfaces 31, 32 have a different geometry from each other.

Typically, it can be considered that the input R30 of the treatment region R3 is merged with the output R22 of the differentiation region R2.

The first treatment interface 31 extends the first differentiation interface, and the second treatment interface 32 extends the second differentiation interface 22.

These two non-reciprocal treatment interfaces 31, 32 are each formed between a treatment core material 30 and an outer material 310, 320, of which one is dielectric and the other is metallic, herein the same as for the differentiation region R2.

They are arranged and determined to produce between them a magneto-plasmonic guidance. In this example, the arrangement of the materials and/or the magnetization is the same as that of the differentiation region, apart from their lateral geometry.

Moreover, they are arranged to have, between the input R30 and the output R32 of said treatment region R3, geometries 319, 329 that are not equivalent to each other.

In the figure, the first treatment interface 31 thus passes through a region 319, shown by a hatched oval, in which it has a first treatment geometry. Similarly, the second treatment interface 32 thus passes through a region 329, shown by a hatched oval, in which it has a second treatment geometry that is determined to produce a different treatment from that produced by the first treatment geometry.

Generally, these two treatment geometries 319, 329 are chosen and determined to produce different effects on the signal over their length as a whole. This difference is preferably obtained by different geometries within one and the same configuration of materials and/or magnetization. Alternatively or in combination, it can also be obtained by different materials and/or a different magnetization.

As will be understood from the figure, this non-reciprocal treatment part R3 thus provides at output, in the first direction, a treated optical signal OS3 the amplitude of which has undergone a first treatment produced by the geometry of the first treatment interface 21 alone. The result of this first treatment is shown herein on the right interface 31, at the output of the first treatment zone 319, by a bold arrow with square dashes.

On the second treatment interface 32, on the left of the figure, the initial signal OS0 does not include any energy that has passed through the second treatment zone 329, or only a very weak part of the energy thereof as shown by the fine dashed arrow.

In the second direction, or reverse direction, the figure shows generally the passage of a reverse input signal OS0B, for example identical to the input signal OS0, when it enters as differentiated reverse signal OS2B then passes through these same regions R3, R2, R1 in the reverse direction, shown by a bold grey arrow, i.e. herein from the top to the bottom of the figure.

Provided it has a non-zero component on the second treatment interface 32, this signal OS2B will thus undergo the second treatment to exit in the form of a treated reverse signal OS3B, shown herein by a bold arrow with round dots.

If this reverse signal OS2B has itself also been concentrated on the interface situated to its right, then it will undergo only the second treatment of the second zone 329, and will exit via the first optical port P1 in the form of a reverse output signal OS9B having undergone only the second treatment.

As will be understood, this component 1 thus provides at output a reverse output signal OS9B having undergone a different treatment from that undergone by the treated signal OS9 travelling in the first direction. An input signal OS0 and a reverse input signal OS0B passing through the first optical port P1 of this component 1 in the two opposite directions, even if they are identical at the input, will exit in two forms from different outputs OS9 and OS9B.

It will be noted that, if this reverse signal OS2B has not been concentrated beforehand on the right interface thereof alone, it may also undergo the first treatment in the first treatment zone 319. However, output signal OS9B thereof will be composed of an energy that has undergone the first 319 and the second 329 treatments. It will thus have undergone a different treatment from the input signal OS0 and will exit OS9B in a different form.

Example Isolator

FIG. 2 shows an example embodiment of a first family, applied to a component 2 with two ports communicating only between each other.

In this example, the second optical port P2 includes a selection region R1B and a differentiation region R2B, having a functionality similar to those R1 and R2 of the first optical port P1, and for example identical.

The differentiation regions thereof are linked to each other by a common region that forms both the non-reciprocal treatment region R3 of the first port P1 and the non-reciprocal treatment region R3B of the second port P2.

Within the embodiments comprising two selection and differentiation ports coupled to each other, this figure shows a particular example in which the non-reciprocal treatment region R3, R3B is arranged to produce an absorption in a direction 319 and a transmission in the reverse direction 329.

In this diagrammatic example, the first treatment interface 31 has a cavity 311 that is arranged to absorb the signal OS2 that reaches it on this magneto-plasmonic interface 31 wholly or partially. The treated signal OS3 that exits therefrom, and thus the output signal OS9, is thus weakened or even non-existent, producing a blocking direction for an input via the first port P1.

In this diagrammatic example, the first treatment interface 31 has a geometry comprising an absorption cavity 311 that has a geometry arranged to absorb an optical signal OS2 of a determined frequency that reaches it on this magneto-plasmonic interface 31 wholly or partially. The treated signal OS3 that exits therefrom, and thus the output signal OS9, is thus weakened or even non-existent, producing a blocking direction for an input via the first optical port P1.

For its part, the second treatment interface 32 has a straight and regular geometry, which is arranged to allow the passage of a reverse input optical signal OS0B that is concentrated OS2B on this second interface 32, since it is on the right thereof from the point of view of the direction of propagation thereof. The treated reverse signal OS3B is thus transmitted unchanged, and exits in the form of a reverse output signal OS9B that is substantially unchanged, or at least that represents the reverse input signal OS0, thus producing a passing direction for an input via the second optical port P2.

FIG. 3a shows a similar example in which the geometry of the first treatment interface 311' has several cavities. It has in particular several cavities having the same dimensions, for absorbing a greater part of the signal of a determined frequency. In this example, the first treatment interface 31 also includes a plurality of absorption cavities that are dimensioned to absorb an optical signal comprising a plurality of different frequencies wholly or partially, in particular a plurality of mutually shifted frequencies so that said treatment interface absorbs all the signals within a determined frequency range.

Each dimension corresponding to a determined frequency (or frequency sub-range) within this range thus obtains a blocking treatment for a wider band.

Such absorption cavities 311, 311' are, for example but not exclusively, of the Helmoltz or Fabry-Perot type; uniformly or of different types.

Moreover, many combinations of cavities are possible, for example several identical cavities for a narrow but deep absorption, and/or several separate absorption ranges, spaced apart from each other.

In the examples of FIG. 3a and FIG. 3b, the second treatment interface 32 has a geometry that is arranged to allow an optical signal to pass having the frequencies or frequency that is absorbed by the first treatment interface 31. As will be understood, this component thus forms an optical isolator for any optical signal situated in the range absorbed by the first interface 31.

Such an isolator can for example isolate a laser source S0 connected to the second port P2, in order to inject it into an optical circuit via the first port P1. This source can then emit in the second direction, which then constitutes the passing or "outward" direction of this isolator, while the returns arriving from the circuit via the first port P1 are blocked in the first direction or "return" direction.

In other example embodiments not detailed herein, the second treatment interface can itself also have absorption cavities but with different characteristics. For example for blocking certain frequencies in one direction and blocking other frequencies in the other direction.

Circulator

FIG. 4 shows an example embodiment of a second family of embodiments, applied to a component with more than two ports communicating between each other.

In this second family, a difference of treatment between the two treatment interfaces 31, 32 of one and the same treatment region R3 is formed by the fact that these two interfaces produce a treatment in the form of a diversion, i.e. in particular they do not lead to the same location, in particular they do not lead to the same optical port.

In such a component the first treatment interface 31 of the first optical port P1 has a geometry that forms a diversion with respect to the second treatment interface 32, in particular to end up at an optical port P2 different from the port P3 reached by this second treatment interface 32, or travel a different distance, or incorporate an additional or different treatment.

In the example of FIG. 4, three optical ports P1, P2 and P3 all communicate with each other. Each optical port P1, P2, P3 comprises its own selection region R1, R1B, R1C, then its own differentiation region R2, R2B, R2C, on leaving which treatment region R3, R3B, R3C thereof communicates with that of the neighbouring ports.

The guidance core of each of the three ports extends and communicates with that of its neighbours, herein in the form of a continuous material forming a sort of star bearing a branch for each port. Each of these branches forms the non-reciprocal treatment core, and is surrounded by the two treatment interfaces thereof. For each optical port, for example P1, the first treatment interface 31 extends on the perimeter of the core to become the second treatment interface 32B of the neighbouring optical port of a first side; while the second treatment interface 32 extends on the perimeter of the core to become the first treatment interface 31C of the neighbouring optical port of the other side, the second side thereof.

Thus, each optical port that receives an input optical signal will conduct it along the first treatment interface thereof towards the neighbouring optical port of the first side; while it may receive along the second treatment interface thereof an output optical signal coming from the optical port of the second side. As will be understood, an optical signal circulator is thus obtained, herein with circulation between three ports.

Thus, a first signal OS0 entering the first optical port P1 is conducted via the first treatment interface 31 thereof towards the second interface 32B of the second port P2 in order to leave it OS9.

For its part, a second signal OS0B entering the second optical port P2 is conducted via the first treatment interface 31B thereof towards the second interface 32C of the third port P3 in order to leave it OS9B.

A third signal OS0C entering the third optical port P3 is conducted via the first treatment interface 31C thereof towards the second interface 32 of the first port P1 in order to leave it OS9C.

This example has three ports, but must be understood as illustrating any number of ports, including four, five, six, seven, eight or any integer value allowed by the precision of the technical methods of implementation.

In other example embodiments not detailed herein, all or some of the treatment interfaces combine and/or alternate several types of treatment, for example diversion and absorption.

For example, it is possible to produce a component where the signals entering via certain ports are diverted while others are absorbed; and/or in which certain frequencies are absorbed while the others are diverted.

The example shown herein relates to a circulation that could be categorized as "complete", inasmuch as each port communicates with an emitting port and with another, receiving, port. It is also envisaged to carry out an incomplete circulation, for example where certain ports form a dead end at input, for example with a first, absorbing, treatment interface and a second, passing, treatment interface.

The optical communication internal to the component 1, 2, 3 is carried out by guidance within an optical core 10, 20, 30, formed by a core material in which the optical signal is guided between the interfaces between this core and its environment, which is made from one or more other materials.

In the present examples, this optical core is produced by a core material within a planar propagation layer C1, which is included between a lower layer C0 and an upper layer C2.

The optical signal is confined within this propagation layer C1 by its lower and upper interfaces, interfaces formed with the lower layer and the upper layer. Typically, these interfaces are planar or at least bidimensional, thus forming a planar guide the lower and upper interfaces of which are uniform and/or regular.

In these examples, the lateral confinement inside the propagation layer C1 is materialized by the lateral interfaces forming planar or bidimensional surfaces transverse to the different layers C0, C1, C2. Inside the propagation layer C1, these lateral interfaces have a shape that varies along the direction of propagation of the signal.

The configuration of such a planar guide with lateral interfaces is particularly advantageous, in particular since it is possible to easily give them any shape whatsoever, possibly very complex, for example simply by means of photolithography, during manufacture of the propagation layer.

Figure 6:
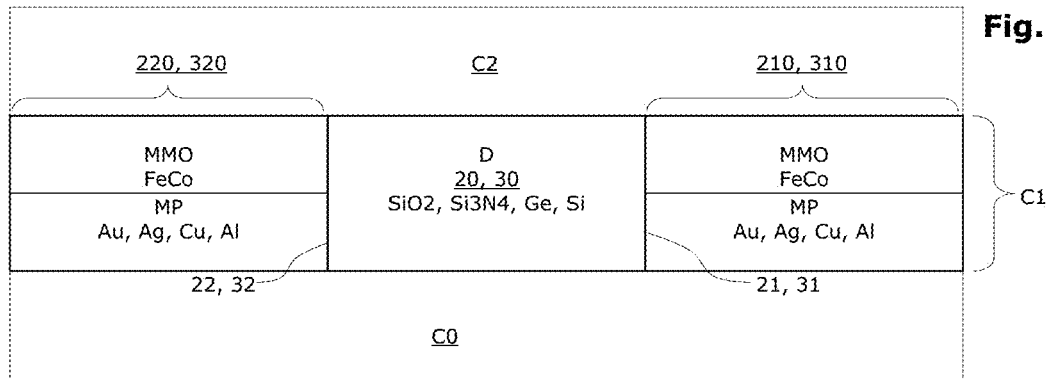
FIG. 6 is a diagrammatic cross section of the optical guide, showing a second example arrangement of the materials of a component according to the invention.
Figure 7:
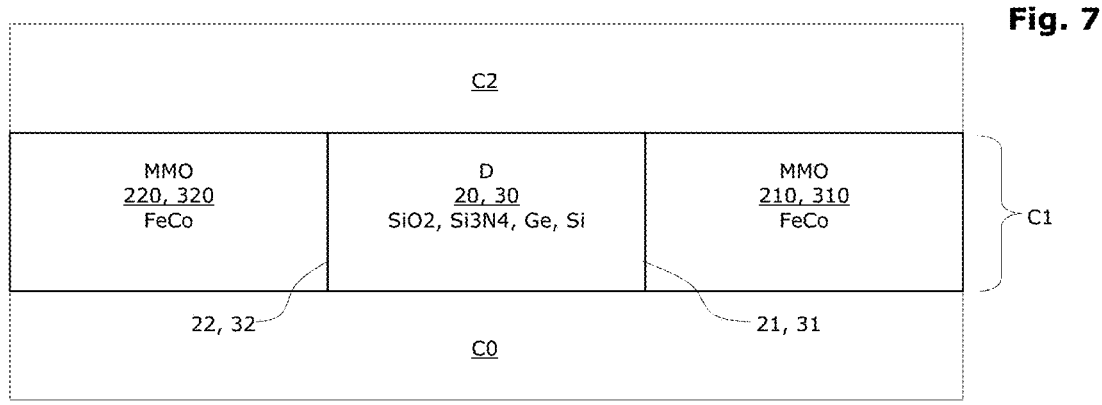
FIG. 7 is a diagrammatic cross section of the optical guide, showing a third example arrangement of the materials of a component according to the invention.

In the examples shown in FIG. 5 to FIG. 7, the lower and upper layers are solid layers; one, C0, is a substrate and the other is a cover layer. In the example shown in FIG. 8, the propagation layer C1 is suspended between two layers, lower and upper, which are formed by the air of the environment.

Magneto-Plasmonic Structure

FIG. 5 to FIG. 8 show examples of magneto-plasmonic structures that can be used to produce the magneto-plasmonic interfaces of a component according to the invention, for example those in FIG. 1, FIG. 2 and FIG. 4.

In the currently preferred embodiments, in particular those shown herein, the magneto-plasmonic guidance cores are made from a dielectric material, herein for the differentiation core 20 and the non-reciprocal treatment core 30. For their part, the outer materials are made from one or more metallic materials. Thus a structure is obtained of the type that can be called "slot", also called MIM (for "Metal Insulator Metal") or MDM (for "Metal Dielectric Metal").

Alternatively, in a fashion that is not shown herein in these cross sections, the component can also be produced in a ribbed configuration, or DMD, with the same types of materials.

FIG. 5 shows a first example arrangement of the materials, for the interfaces 21, 22 of the differentiation region R2 and the interfaces 31, 32 of the non-reciprocal treatment region R3.

In this configuration, the outer material 220, 320 and 210, 310 is a metal of plasmonic type or a metal alloy of plasmonic type, herein referenced "MP", in particular selected from gold, silver, copper, aluminium, and a mixture of two, three or four of these materials.

The material of the guidance core 20, 30 is a dielectric material of the magneto-optical material type, herein referenced DMO, in particular a garnet oxide or a dielectric material doped with ferrite particles, such as for example a mineral silica doped with cobalt ferrite nanoparticles.

FIG. 3a and FIG. 3b show, for an example isolator according to this structure, the non-reciprocal treatment part R3. The guidance core 30, in a direction of propagation parallel to the axis x, is made from a magneto-optical dielectric material, for example of the magneto-optical garnet oxide type. This is bismuth iron garnet ("BIG") herein, but other known materials can be used, such as Bi:YIG or Ce:YIG. The outer materials 310, 320 are made from gold (Au) herein, and thus produce magneto-plasmonic interfaces 31, 32 under the effect of transverse magnetization "M" along the axis y. The first treatment interface 31 has one or more loss cavities, extending laterally in the outer material 310 along the axis z, formed on a single one of the walls of the MIM guide. These cavities 311' have different dimensions, and several examples of each dimension. The cavities can have different geometries, for example rectangular, in particular of the Helmholtz type.

FIG. 6 shows a second example arrangement of the materials, for the interfaces 21, 22 of the differentiation region R2 and the interfaces 31, 32 of the non-reciprocal treatment region R3.

In this configuration, the outer material is a metallic structure formed by superposition of layers of two different metals MMO and MP.

These two metals are then:
- on the one hand a metal of plasmonic type or a metal alloy of plasmonic type, herein referenced MP, in particular selected from gold, silver, copper, aluminium, and a mixture of two, three or four of these materials; and
- on the other hand a metal of magneto-optical type, herein referenced MMO, in particular an iron-cobalt alloy.

The material of the core 20, 30 is then a dielectric, typically that is not magneto-optical and herein referenced "D", in particular selected from silica, silicon nitride, germanium, silicon, and a mixture of several of these materials.

FIG. 7 shows a third example arrangement of the materials, for the interfaces 21, 22 of the differentiation region R2 and the interfaces 31, 32 of the non-reciprocal treatment region R3.

In this configuration, the outer material is a metal of magneto-optical type, herein referenced MMO, in particular an iron-cobalt alloy.

The material of the core 20, 30 is then a dielectric, typically that is not magneto-optical and herein referenced "D", in particular selected from silica, silicon nitride, germanium, silicon, and a mixture of several of these materials.

Figure 8:
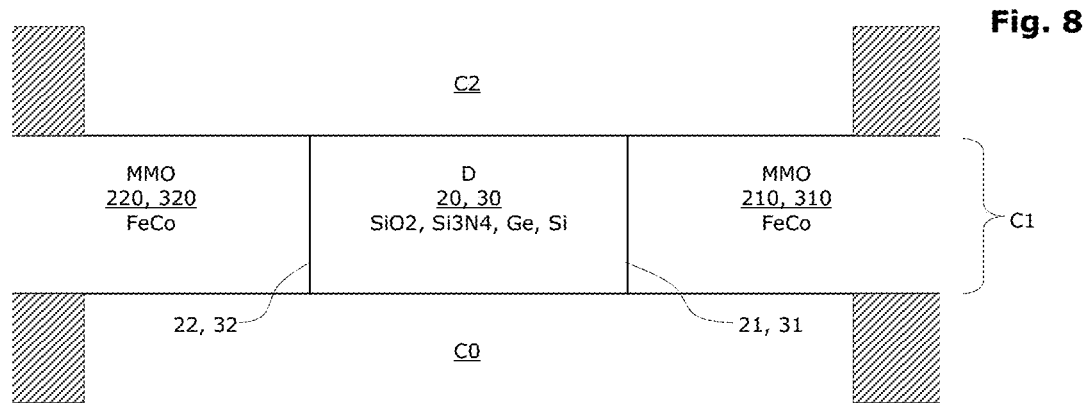
FIG. 8 is a diagrammatic cross section of the optical guide, showing a fourth example arrangement of the materials of a component according to the invention.

FIG. 8 shows a fourth example arrangement of the materials, herein in the form of a variant of the configuration in FIG. 7. In this example, the propagation layer C1 is suspended and uncovered. That is to say that the lower layer C0 and respectively the upper layer C2 are formed by air, or any other surrounding atmosphere. It will be noted that the characteristics of a suspended and/or uncovered propagation layer C1 are also applicable to the other magneto-plasmonic structures.

Of course, the invention is not limited to the examples that have just been described, and numerous modifications may be made to these examples without exceeding the scope of the invention.

| | Nomenclature |
|---|---|
| 1 | non-reciprocal component |
| 2 | isolator |
| 3 | circulator |
| 10 | selection core |
| 11, 12 | first and second selection interfaces |
| 110, 120 | outer material of the first and second selection interfaces |
| 20 | differentiation core |
| 21, 22 | first and second differentiation interfaces |
| 210, 220 | outer material of the first and second differentiation interfaces |
| 30 | non-reciprocal treatment core |
| 31, 32 | first and second non-reciprocal treatment interfaces |
| 310, 320 | outer material of the first and second non-reciprocal treatment interfaces |
| 311 | absorption cavity |
| 311' | group of absorption cavities |
| 319, 329 | geometry of first and second non-reciprocal treatment |
| 31B, 32B | first and second non-reciprocal treatment interfaces (second optical port) |
| 31C, 32C | first and second non-reciprocal treatment interfaces (third optical port) |
| C0 | lower layer |
| C1 | propagation layer |
| C2 | cover layer |
| OS0 | first input optical signal (return) |
| OS0B | second input optical signal (reverse, outward) |
| OS0C | third input optical signal |
| OS1 | first selected optical signal (return) |
| OS2 | first differentiated optical signal (return) |
| OS3 | first treated optical signal (return) |
| OS9 | first output optical signal (return) |
| OS1B | second selected optical signal (reverse, outward) |
| OS2B | second differentiated optical signal |
| OS3B | second treated optical signal |
| OS9B | second output optical signal |
| OS1C | third selected optical signal |
| OS9C | third output optical signal |
| P1 | first optical port |
| P2 | second optical port |
| P3 | third optical port |
| R1 | selection region |
| R10 | input part (of the selection region) |
| R11 | selection aperture (of the selection region) |
| R12 | selection part (of the selection region) |
| R2 | differentiation region |
| R20 | input part (of the differentiation region) |
| R22 | output part (of the differentiation region) |
| R3 | non-reciprocal treatment region |
| R30 | input part (of the treatment region) |
| R32 | output part (of the treatment region) |
| R1B | selection region (second optical port) |
| R1C | selection region (third optical port) |
| R2B | differentiation region (second optical port) |
| R2C | differentiation region (third optical port) |
| R3B | non-reciprocal treatment region (second optical port) |
| R3C | non-reciprocal treatment region (third optical port) |
| S0 | laser source |
| Wd | differentiation width |
| We | selection width |
| $W_{R0}$ | input width of the selection region R1 |

The invention claimed is:

1. An optical component comprising: at least one first port or optical guide, and a second port or optical guide, communicating between each other in non-reciprocal optical fashion, which connect said component or allow the connection thereof within a guided optical circuit, so as to be able to exchange an optical signal with said optical circuit on the one hand in a first direction and on the other hand in a second direction, which is opposite to the first direction, through at least one magneto-plasmonic guidance region;

said component includes a plurality of regions that can be passed through successively by the optical signal travelling, in the first direction, from said first optical port towards said second optical port, said regions comprising at least, in this order:

a selection region arranged to
  receive at input an input optical signal propagating there according to an input optical impedance $z0_{eff}$, and
  emit at output, by means of plasmon guidance, an optical signal called selected optical signal, including a first plasmon mode and a second plasmon mode, defined as being the LR mode for one and the SR mode for the other, in which the second plasmon mode has an amplitude that is zero, or significantly lower than the first plasmon mode;

a differentiation region arranged to receive at input the selected optical signal originating from the selection region, and guide it to an output part where it forms an optical signal called differentiated optical signal, by a guidance core called differentiation core extending between at least two interfaces, called differentiation interfaces;

which differentiation interfaces:
  are formed between a core material and at least one outer material, of which one is dielectric and the other is metallic,
  are situated on two opposite sides, and
  are determined to produce between them a magneto-plasmonic guidance with magneto-optical effect;

said output part being arranged to have, between said differentiation interfaces, a differentiation width Wd chosen so that the first plasmon mode of the signal has an amplitude asymmetry, between said differentiation interfaces, greater than a determined threshold;

said differentiation region thus providing at output an asymmetrical optical signal, called differentiated signal, the amplitude of which is concentrated on the first differentiation interface;

a non-reciprocal treatment region arranged to receive at input the differentiated signal originating from the differentiation region, and guide it via a treatment part to an output region where it forms an optical signal called treated optical signal;

via a guidance core, called treatment core, extending between at least one first treatment interface and a second treatment interface;

which treatment interfaces:
  are each formed between a treatment core material and an outer material, of which one is dielectric and the other is metallic,
  are situated on the same two opposite sides as the first and respectively second differentiation interfaces,
  are determined to produce between them a magneto-plasmonic guidance, and
  are arranged to have, between the input and the output of said treatment region, geometries that are not equivalent to each other;

said non-reciprocal treatment part thus providing at output, in the first direction, a treated optical signal the amplitude of which has undergone a treatment produced by the geometry of the first treatment interface alone;

while a signal called reverse signal, passing through said treatment region in the second direction, will undergo a treatment produced by the geometry of the second treatment interface alone or by both the two treatment interfaces, thus providing a treated reverse signal having undergone a different treatment from that undergone by the treated signal travelling in the first direction.

2. The component according to claim 1, characterized in that the selection region has:
  an input part forming a guidance that has, for the signal received at input, an input optical impedance $z0_{eff}$, and
  an output part forming a magneto-optical plasmon guidance between two magneto-plasmonic interfaces;
  which communicate via a selection aperture that has a selection width;
  and in that the values of the input optical impedance $z0_{eff}$ and of the selection width are chosen so that:
    the first plasmon mode has a first optical impedance $z1_{eff}$ that is substantially equal to the input optical impedance $z0_{eff}$, and
    the second plasmon mode has a second optical impedance $z2_{eff}$ that is significantly different from the first optical impedance $z1_{eff}$,
  such that the input signal excites, in the output part and through the selection aperture, an optical mode according to the first plasmon mode, to the exclusion of the second plasmon mode or with an amplitude significantly greater than that of the second plasmon mode, thus forming a selected optical signal.

3. The component according to claim 2, characterized in that the differentiation region has a geometry having an increasing width from the input width thereof to the differentiation width, and
  the non-reciprocal treatment region has a geometry the input width and/or the average width of which are substantially equal to the differentiation width.

4. The component according to claim 1, characterized in that the differentiation core and/or the treatment core are made from a dielectric material, and the outer materials thereof are made from one or more metallic materials,
  and in that these materials are chosen to produce between them a plasmon guidance interface implementing a magneto-optical effect.

5. The component according to claim 1, characterized in that the differentiation core and/or the treatment core are made from a metallic material, and the outer materials thereof are made from one or more dielectric materials,
  and in that these materials are chosen to produce between them a plasmon guidance interface implementing a magneto-optical effect.

6. The component according to claim 1, characterized in that the different cores are produced, wholly or partially, in a planar or bidimensional layer included between a lower layer and an upper layer, and in that the interfaces producing the guidance in said cores form planar or bidimensional surfaces transverse to said layers.

7. The component according to claim 1, characterized in that the selection region is arranged so that the first plasmon mode corresponds to the LRSPP-type mode of the input signal.

8. The component according to claim 1, characterized in that the first treatment interface has a geometry comprising one or more absorption cavities that have a geometry arranged to absorb an optical signal of a determined frequency wholly or partially, while the second treatment interface has a geometry that is arranged to allow the passage of an optical signal of said determined frequency.

9. The component according to claim 8, characterized in that the first treatment interface includes a plurality of absorption cavities that are dimensioned to absorb an optical signal comprising a plurality of different frequencies wholly or partially,
while the second treatment interface has a geometry that is arranged to allow the passage of an optical signal of one or more frequencies within said determined frequency range.

10. The component according to claim 8, characterized in that the first and second optical guides or ports—each comprise a selection region and a differentiation region, and are linked to each other by at least one first treatment region, the first treatment interface of which is arranged to absorb an optical signal of one or more determined frequencies wholly or partially, and the second treatment interface of which is arranged to allow the passage of said optical signal, thus producing an optical isolator for said optical signal.

11. The component according to claim 1, characterized in that the first treatment interface of the first optical port has a geometry that forms a diversion with respect to the second treatment interface.

12. The component according to claim 11, characterized in that the first treatment interface of the first optical port has a geometry that connects it with the second optical port so as to guide a differentiated optical signal originating from said first port to emit an output optical signal via said second port,
while the second treatment interface of said first optical port has a geometry that connects it with a third optical port different from the second port-, to receive a differentiated optical signal originating from said third port and emit it as an output optical signal via the first port, thus producing an optical circulator.

13. The component according to, claim 1, characterized in that it is arranged and determined to treat an optical signal having a wavelength less than 50 μm.

14. The component according to claim 1, characterized in that, for the interfaces of the differentiation region and/or the treatment region:
the metallic material is a metal of plasmonic type or a metal alloy of plasmonic type, and
the dielectric material is a magneto-optical material.

15. The component according to claim 1, characterized in that, for the interfaces of the differentiation region and/or the treatment region, the metallic material is a superposition of layers or a mixture of at least:
on the one hand a metal of plasmonic type or a metal alloy of plasmonic type, and
on the other hand a metal of magneto-optical type.

16. The component according to claim 1, characterized in that, for the interfaces of the differentiation region and/or the treatment region:
the metallic material is a metal of magneto-optical type, and
the dielectric material is a dielectric that is not magneto-optical.

17. A device comprising one or more non-reciprocal optical components according to claim 1, produced in integrated fashion within an integrated optical circuit.

18. The device according to claim 17, characterized in that the integrated optical circuit includes at least one integrated laser emitter, and in that it comprises at least one non-reciprocal optical component that is connected to said laser in order to allow an optical signal emitted by said laser to pass in one direction, while preventing or reducing a return of the optical signal towards said laser in the opposite direction.

19. The device according to claim 17, characterized in that the integrated optical circuit comprises a plurality of sensors produced or connected in integrated fashion, and in that it comprises at least one non-reciprocal optical component that is connected with at least two of said sensors.

20. The device according to claim 17, characterized in that the integrated optical circuit comprises at least one non-reciprocal optical component that is connected to produce a Michelson interferometer in a wholly or partially integrated fashion.

21. A method for treatment of an optical signal characterized in that it comprises a treatment of said optical signal by passing through at least one non-reciprocal optical component according to claim 1.

\* \* \* \* \*